(12) United States Patent
Ivashin et al.

(10) Patent No.: US 7,274,377 B2
(45) Date of Patent: Sep. 25, 2007

(54) VIEWPORT PANNING FEEDBACK SYSTEM

(75) Inventors: Victor Ivashin, Danville, CA (US); Jamie C. Rasmussen, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 11/260,963

(22) Filed: Oct. 28, 2005

(65) Prior Publication Data

US 2007/0097150 A1 May 3, 2007

(51) Int. Cl.
*G09G 5/00* (2006.01)
*G09G 5/10* (2006.01)
*G06F 3/048* (2006.01)

(52) U.S. Cl. ............... 345/619; 345/672; 345/684; 345/687; 715/781; 715/784; 715/786

(58) Field of Classification Search ........... 345/619, 345/648, 672, 680, 684, 589, 592, 687–689, 345/629; 715/784–787, 764, 768
See application file for complete search history.

(56) References Cited

U.S. PATENT DOCUMENTS

| | | | | |
|---|---|---|---|---|
| 5,075,673 | A * | 12/1991 | Yanker | 345/684 |
| 5,568,603 | A * | 10/1996 | Chen et al. | 715/784 |
| 5,896,132 | A | 4/1999 | Berstis et al. | |
| 6,476,831 | B1 * | 11/2002 | Wirth et al. | 715/784 |
| 6,570,594 | B1 | 5/2003 | Wagner | |
| 6,686,927 | B2 | 2/2004 | Meier et al. | |
| 6,750,886 | B1 | 6/2004 | Bergstedt | |
| 6,847,386 | B2 | 1/2005 | Paleiov | |
| 6,972,776 | B2 * | 12/2005 | Davis et al. | 345/684 |
| 7,050,072 | B2 * | 5/2006 | Lipsky et al. | 345/672 |
| 2002/0084981 | A1 * | 7/2002 | Flack et al. | 345/157 |
| 2002/0126154 | A1 | 9/2002 | Watson | |
| 2002/0135602 | A1 | 9/2002 | Davis et al. | |
| 2003/0169280 | A1 | 9/2003 | Hsieh | |
| 2005/0071774 | A1 * | 3/2005 | Lipsky et al. | 715/765 |
| 2005/0125739 | A1 * | 6/2005 | Thompson et al. | 715/768 |
| 2006/0048073 | A1 * | 3/2006 | Jarrett et al. | 715/784 |
| 2006/0236243 | A1 * | 10/2006 | Brain et al. | 715/704 |
| 2007/0008337 | A1 * | 1/2007 | White et al. | 345/629 |

* cited by examiner

*Primary Examiner*—Kee M. Tung
*Assistant Examiner*—Chante Harrison

(57) ABSTRACT

A graphical user interface (GUI) displaying a viewport includes a panning control region defined within an outer boundary of the viewport within the GUI. The panning control region includes multiple segments, each of the multiple segments corresponding to a panning direction, wherein a panning rate is indicated by a level of translucency of the multiple segments. A panning available region defined along the outer boundary of the viewport within the GUI is included. The panning available region indicates whether a source image extends beyond an edge of the viewport, and the panning available region is a subset of the panning control region. A method for panning an image through a viewport and a computing device are also provided.

20 Claims, 13 Drawing Sheets

VIEWPORT PANNING FEEDBACK SYSTEM

BACKGROUND OF THE INVENTION

In computer applications, users display and interact with a variety of digital content. This content may include images, video, documents, web pages, applications, or any other information. Often more than one type of content needs to be viewed simultaneously. Windowing systems are employed in graphical operating systems for this purpose. A window defines a region, or area, on a display that will hold a particular digital content. Multiple windows can be defined and can overlap one another for the purpose of sharing a limited display area.

Frequently, it is necessary to display content whose dimensions are larger than any available display, or window region, is capable of containing. Also, in many instances, users need to work with fine details that require magnifying or scaling the digital content. For example, a user may need to magnify a document for legibility, or may need to make precise adjustments to a figure in an engineering or painting program. Typically it is difficult or impossible to contain the entire digital content at the required scale within the available display area or window region.

To facilitate these difficulties, windowing user interfaces often use a standard mechanism called the viewport. A viewport defines a dimensional area mapped to a position over a source content. The dimensions and position of the viewport determine if all or a portion of the source content is mapped. A region within a user interface window typically contains a viewport window which provides a view through the viewport to the mapped portion of the source content. The dimensions of the viewport window are typically limited to that of the window region the viewport window occupies. The window containing the viewport window typically provides some means for adjusting the position of the viewport over the source content, thus affecting which portion of the source content is visible in the viewport window. The relationship between viewport window dimensions and the viewport is not fixed. The viewport dimensions may be smaller or larger than the viewport window and thus the viewport window would show a scaled version of the viewport mapped source content.

Operating system user interfaces typically allow for moving and resizing windows. Resizing a window containing a viewport window may result in the viewport window's dimensions being resized, which in turn could change the size of the viewport, thereby revealing more or less source content as seen through the viewport window. Alternately, a change in size of the viewport window may not change the size of the viewport, thereby resulting in a scaled version of the source content. However, moving a window on a display usually does not change the viewport window's view of the source content as the viewport's relative position to the source is unchanged. Other interfaces are usually used to reposition a viewport relative to the source content. These interfaces may include mechanisms to position the viewport at specific positions over the source content, e.g. center, top-left, etc. Alternatively, the interfaces may provide a method for continuous repositioning toward a target direction, i.e. panning.

Some of the most common techniques for panning a viewport include scrollbars, automatic panning boundary region, drag panning, and mouse/wheel control panning. Each of these techniques has disadvantages, such as, limiting the available viewing area, limited ability to customize control of the panning, limited feedback to the user about the panning operation and other intrusive characteristics.

As a result, there is a need to solve the problems of the prior art to provide a method and apparatus for panning a viewport using a non-intrusive interface where the user is provided feedback in a minimally intrusive manner and where the viewport panning operation may be modified by a user.

SUMMARY OF THE INVENTION

Broadly speaking, the present invention fills these needs by providing a panning system with a minimally intrusive feedback method and a method to configure the panning functionality. It should be appreciated that the present invention can be implemented in numerous ways, including as a process, a system, or a device. Several inventive embodiments of the present invention are described below.

In one embodiment, a method for panning an image through a viewport is provided. The method initiates with indicating available panning directions visually on the viewport. The method includes positioning a visual marker within a panning region of the viewport and triggering movement of the viewport through the image in a direction associated with the panning region in response to the positioning of the visual marker. Contemporaneously with the triggering, the method further provides displaying within the panning region a relative amount of available panning in the associated direction.

In another embodiment, a graphical user interface (GUI) displaying a viewport therein is provided. The GUI includes a panning control region defined within an outer boundary of the viewport within the GUI. The panning control region includes multiple segments, each of the multiple segments corresponding to a panning direction, wherein a panning rate is indicated by a level of translucency of the multiple segments. A panning available region defined along the outer boundary of the viewport within the GUI is included. The panning available region indicates whether a source image extends beyond an edge of the viewport, and the panning available region is a subset of the panning control region.

In yet another embodiment, a computing device configured to interact with other computing devices is provided. The computing device includes a central processing unit (CPU) and a memory storing a sharing application. The sharing application enables the computing device to create a virtual link with one of the other computing devices so that input devices of the computing device appear physically connected to another of the computing devices. A display screen configured to display a first portion of image data from the one of the other computing devices within a viewport of the computing device is included. Viewport logic configured to provide multiple visual indicators revealing availability of panning the image data, availability of a panning direction, a relative location of the first portion of the image data within the source content/image data, and a panning rate when moving from the first portion of image data along a panning path to a second portion of the image data is provided. A bus enables communication between the CPU, the memory, the display screen, and the viewport logic.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method that provides visual feedback, which includes dynamic rate and directional information to a computer user during interactive panning of a viewport over a source surface. It will be obvious, however, to one skilled in the art, that the present invention may be practiced without some or all of these specific details. In other instances, well known process operations have not been described in detail in order not to unnecessarily obscure the present invention.

The embodiments described below provide a graphical user interface (GUI) that enables a user to configure the panning functionality. In addition, the system enabling the GUI is configured to provide visual feedback to a user during interactive panning of the viewport over source image data. In one embodiment, the user is given fine-grained configurable control over the rate of speed and direction of the panning operation. Additionally, all elements of the invention are designed to be minimally intrusive or non-intrusive. This non-intrusiveness is particularly useful when an application's context creates constraints on the usage of commonly available input devices. The viewport panning/positioning system described herein offers visual feedback in a minimally intrusive manner and operates such that input devices are minimized or shared/automated, e.g., with reference to a remote machine's requirements wherein the remote machine is accessed through a sharing application.

Characteristics of the viewport positioning control system for such sharing applications includes providing feedback without inserting interface elements at the expense of reducing the area occupied by the source content, yet the feedback is visually distinct from the source image. The system does not interfere with the user's natural contextual interaction with the source content, e.g., when performing "dragging" operations with a mouse or pointer across the entire source image. Feedback is provided in real-time to inform the user about any repositioning that is occurring or can occur and specialized input devices are not required for basic operation. The system does not require adroit manipulation of a standard input device for basic operation, e.g., precise positioning of a pointer or pressing a combination of buttons. The system described herein provides both fine granularity of positioning of the viewport position while also allowing the viewport to be rapidly positioned across the source image. Simple changing of the direction and speed of the viewport's movement is enabled through the embodiments described herein, especially when the viewport can be panned in two dimensions. As described in further detail below, users are able to customize the controls' behavior for maximum comfort and productivity.

Figure 1A:
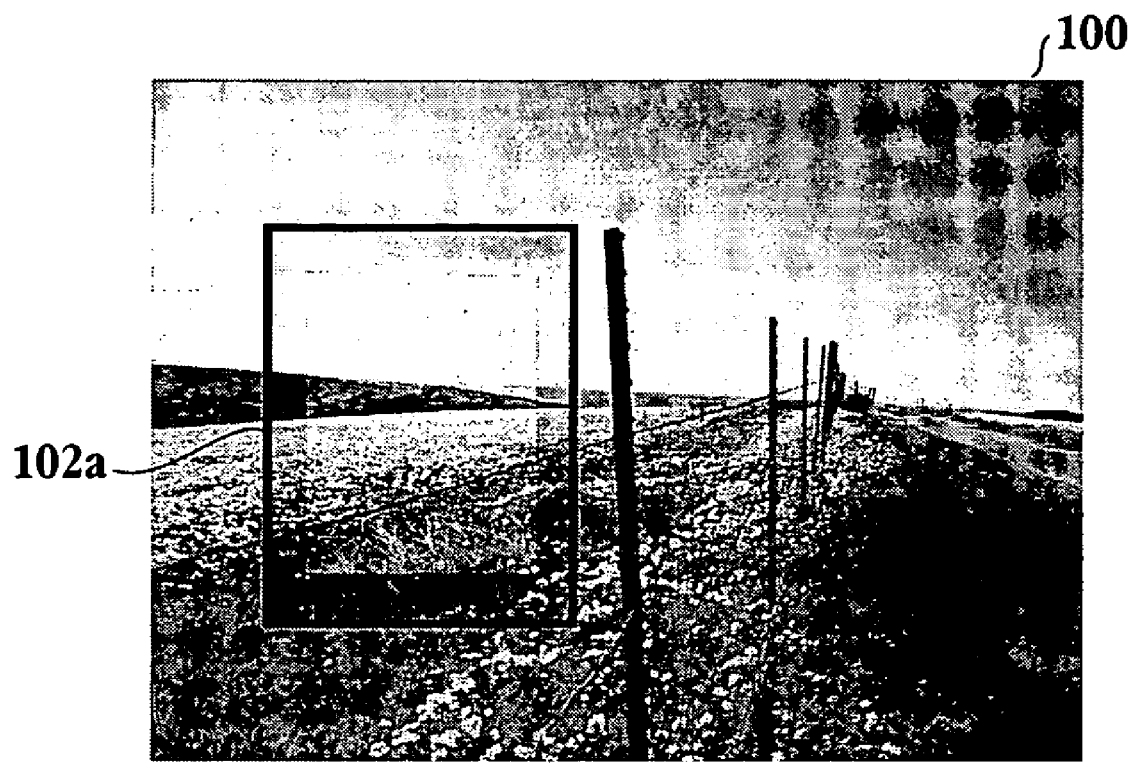
FIGS. 1A and 1B represent a source content over which a viewport window is moving in accordance with one embodiment of the invention.
Figure 1B:
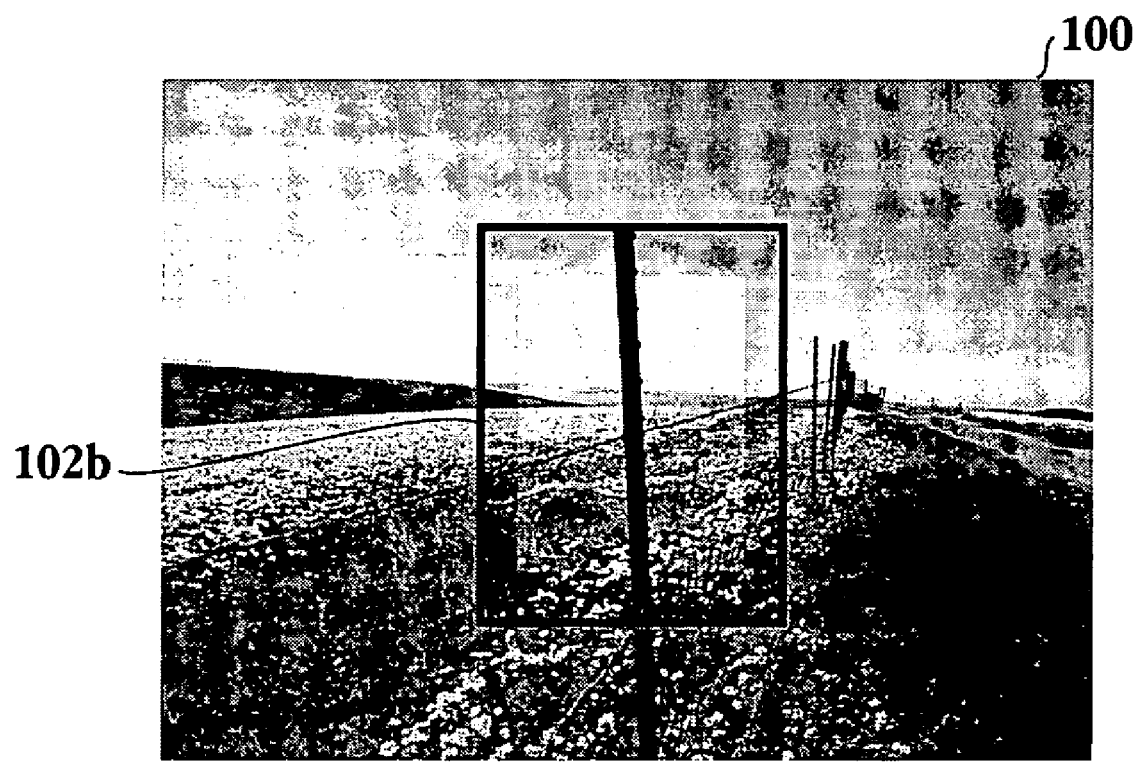

FIGS. 1A and 1B represent a source content over which a viewport window is moving in accordance with one embodiment of the invention. As illustrated in FIGS. 1A and 1B, source content 100 is larger than any available display or window region represented by viewports 102a and 102b. Frequently, it is necessary to display content whose dimensions are larger than any available display or window region that is available. Also, in many instances, users need to work with fine details that require magnifying or scaling the digital content. For example, a user may need to magnify a document for legibility, or the user may need to make precise adjustments to a figure in an engineering or painting program. In one specific example, the user may be designing an integrated circuit and the floorplan of the design may have to be magnified to a degree incapable of fitting on any display. Viewports 102a and 102b are represented by a rectangular region large enough to only show a portion of the source image 100. In FIG. 1B, viewport 102b has been moved or panned to the right to reveal a different portion of source content 100 in accordance with the embodiments described below.

It should be appreciated that with an increasing prevalence of high speed networks interconnecting computer systems, tools such as application sharing, desktop sharing, and remote management are becoming commonplace. These applications allow a computer user at one location to view and interact virtually with a computer at a remote location. Application or desktop sharing allows a computer user to view the graphical output of a remote computer or some portion of it, on their local computer. In many cases, the user is not limited to passive viewing of this output, but can interact with the remote computer via the local keyboard, mouse, or other suitable input devices. Viewports are commonly used along with most application sharing software as the image from the remote computer may be too large to display on the local computer. For example, this may be a common occurrence when the local computer has a small screen, as with a laptop or personal digital assistant, and can also occur because the image is being magnified, or because a portion of the local display is available for this purpose.

Interactive sharing applications generally create a virtual link between the local computer and a remote computer. This virtual link behaves such that the local computer's mouse and keyboard input appear to be connected physically to the remote computer, i.e., local inputs are transmitted to the remote machine for processing. Likewise, the remote computers display output appears to be connected physically to the local computer's monitor. Viewport windows are used on the local display to restrict the size and area occupied on the local machine's display for the remote computer's output. Activities outside the interactive sharing applications viewport on the local computer also require local machine input. Generally, the mouse pointer location, which may be referred to as a cursor, visual marker, pointer, interface panning control pointer, user interface pointer, mouse cursor, or mouse pointer, defines when local input is directed toward the virtual connection to the remote computer, i.e., when the mouse pointer is within a viewport window means that all local input shall be directed toward the remote computer for processing.

This unique limited input device nature of interactive computer sharing applications creates some difficulties for controlling the local machine's viewport view of the remote machine's output. For example, the local application window, in addition to containing a viewport window to the remote machine, may also contain scrollbars that can be used to pan the viewport position over the remote computer's source output. However, if the remote computer's source output shows a window containing scrollbars, the ability to differentiate the local window's scrollbars from those of the remote computer in the viewport window becomes problematic. This may occur for any source image containing standard window controls such as scrollbars that can cause visual confusion when these are similar to the controls for the viewport panning operation itself.

Furthermore, moving a viewport position using scrollbars requires local machine input to be directed to the local window, which may interrupt input activity that should be directed toward the remote machine. For example, the local user in an application sharing session may want to drag an icon from one location on the remote computer's desktop to another. A viewport position that allows the user to see the remote computer's target desktop icon and begin the drag might not permit the user to see the target drop location until the viewport is panned. In most configurations, a drag operation requires that a mouse button be kept pressed for the duration of the operation and if the mouse button is released, the drag ends at the pointer's current location. Scrollbar viewport positioning controls require moving the mouse outside the viewport window's boundaries and clicking, which cannot be done concurrently with a drag. A user in this situation often needs to drag the icon partway, stop and reposition the viewport, drag the icon a bit further, stop and reposition the viewport, etc. In addition to being time consuming, a drag that is stopped in an unwanted place could have unwanted consequences, such as causing movement of files, attempted opening of dragged documents in an application, etc.

The embodiments described herein illustrate a viewport panning/positioning system that offers panning in a non-intrusive manner with minimally-intrusive visual feedback of a panning rate and direction. The position of the mouse within the triggering regions may indicate the panning direction. In addition, it is possible to pan left and up at the same time using this technique. The non-intrusive design of the system described herein allows for the user to interact, through a sharing application with a viewport, with a remote machine without changing or interrupting input requirements on the remote computing device or requiring specialized inputs on the local machine. Feedback is also non-intrusive so that activities feel natural and do not distract from the viewport source content context. As described in more detail below, the embodiments provide multiple feedback indicators that reveal availability of a viewport panning direction, relative location and range of a viewport position within the source content, panning rate feedback for accurate positioning control, and enable a user to configure the size of the panning region.

Figure 2:
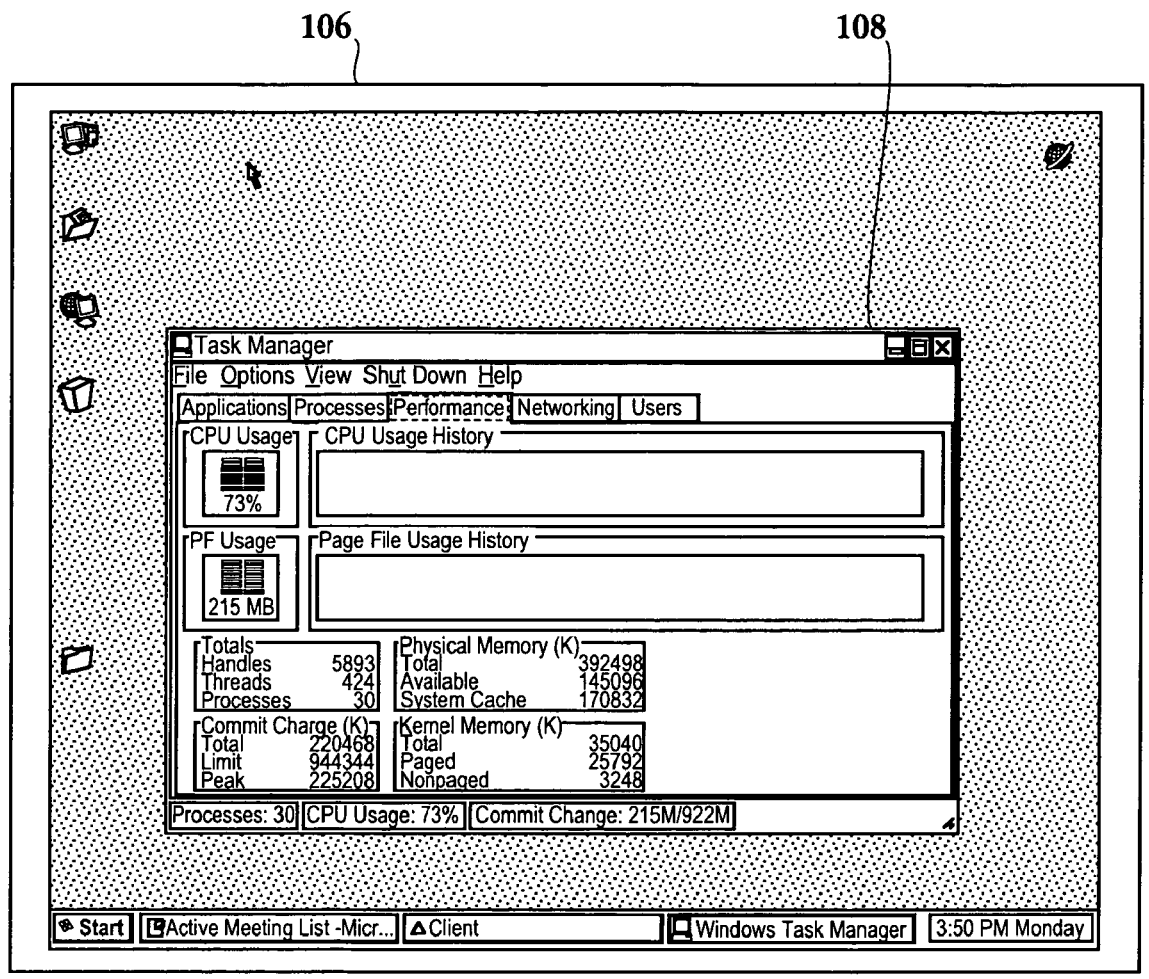
FIG. 2 illustrates a simplified schematic diagram of a source image of a desktop that is smaller than a viewport.

FIG. 2 illustrates a simplified schematic diagram of a source image of a desktop that is smaller than a viewport. Viewport 106 is larger than source image 108, therefore, the entire source image may be displayed within the viewport. Thus, no panning control or feedback is visible, or necessary, when the viewport 106 is able to illustrate the entire source content 108. However, when dimensions become smaller than that of the source content the viewport window's positioning controls are appropriately activated as described in more detail below.

Figure 3:
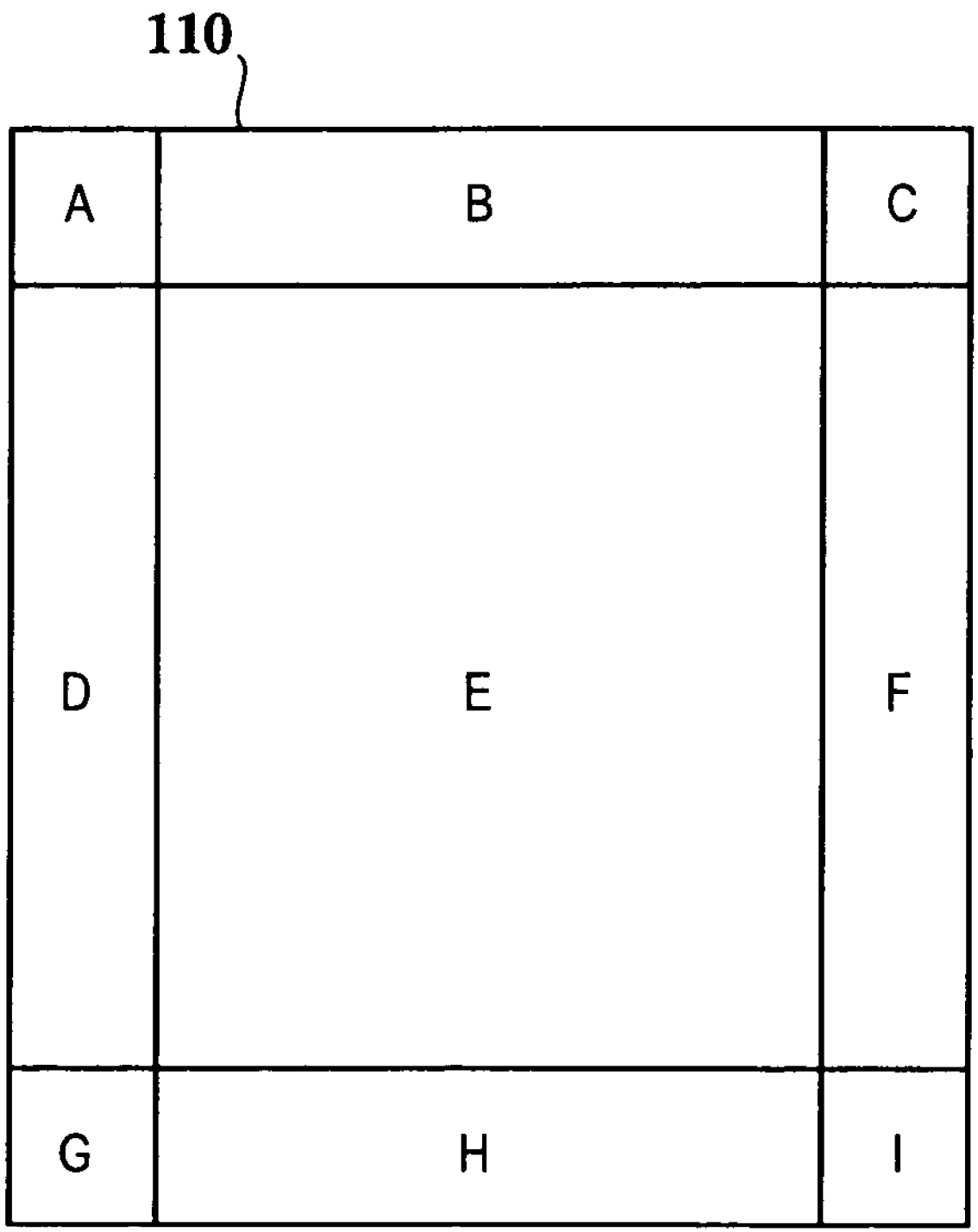
FIG. 3 is a simplified schematic diagram illustrating a viewport window mapped over a portion of source content in accordance with one embodiment of the invention.

FIG. 3 is a simplified schematic diagram illustrating a viewport window mapped over a portion of source content in accordance with one embodiment of the invention. Viewport 110 is divided into invisible panning regions. In one embodiment, there are nine invisible regions, illustrated by regions A-I. The union of all the outside regions, i.e., all regions except region E, is considered to be the panning margin, which may also be referred to as the panning region, and contains the individual panning regions A, B, C, D, F, G, H, I. In another embodiment, the panning region defines the regions in which panning control of the viewport may be enabled as described in more detail with reference to FIG. 4. Region E depicts a region never obscured by the panning controls or feedback indicators in this embodiment. It should be appreciated that while viewport 110 of FIG. 3 is divided into nine regions, this depiction is exemplary and the viewport may be divided into any suitable number of regions. It should be further appreciated that the individual panning regions may overlap and be used selectively according to context. In addition the regions can be a rectangle, square, triangle, circle, or other suitable shape.

Figure 4:
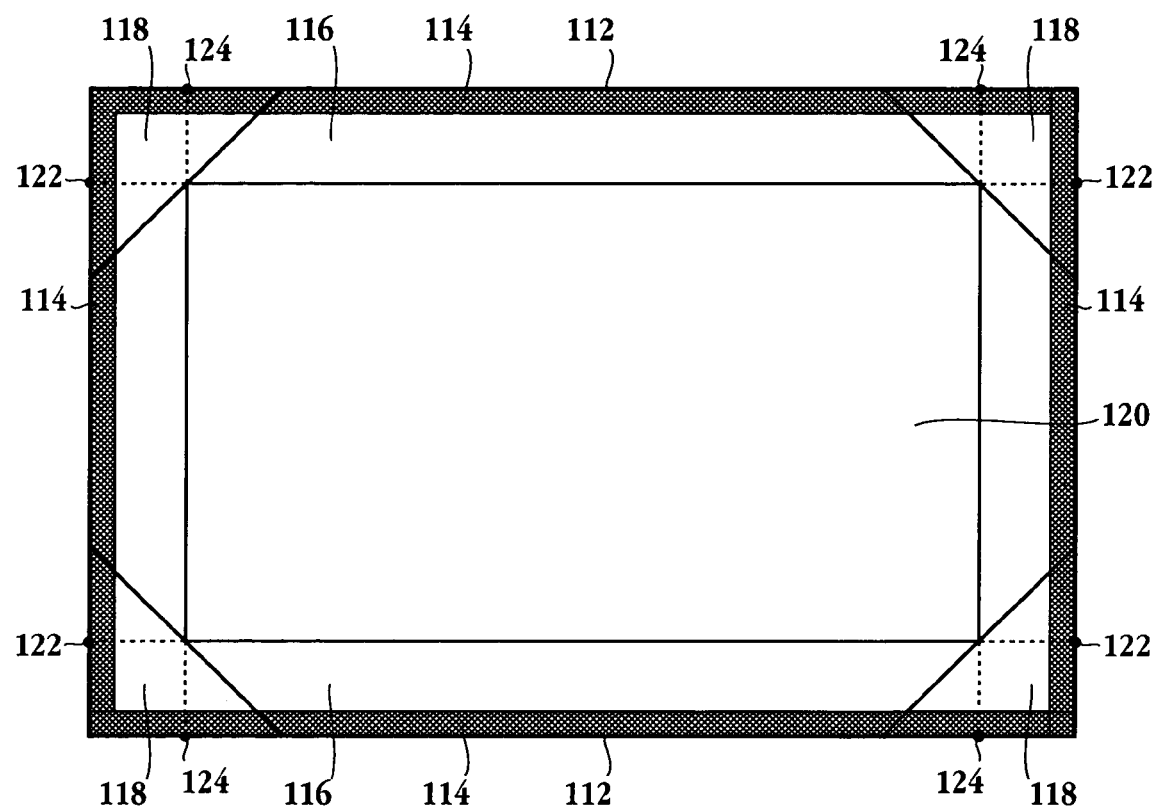
FIG. 4 is a simplified schematic diagram illustrating a viewport window and corresponding exemplary regions in accordance with one embodiment of the invention.

FIG. 4 is a simplified schematic diagram illustrating a viewport window and corresponding exemplary regions in accordance with one embodiment of the invention. Viewport window 112 includes panning available range indicator regions 114, panning regions 116 and 118, which can be utilized to pan in a horizontal, vertical, or diagonal direction. In one embodiment, panning regions 116 and 118 are configured to illustrate a panning rate feedback indicator, e.g., a degree of translucency of a region or a directional indicator, such as an arrow, indicating a panning direction as illustrated with reference to FIGS. 5B-C and 7A-B. It should be appreciated that within viewport 112, panning regions 118 are defined by triangular sections in the corner of the viewport, while panning regions 116 are defined by rectangular regions along the edges of the viewport. In this embodiment, panning regions 118 are for panning in a diagonal manner, while panning regions 116 are associated with panning in a vertical or horizontal direction. As illustrated, panning regions 116 and 118 overlap each other. As used herein, panning regions 116 and 118 may be referred to as panning control regions. In one embodiment, the degree of translucency is provided by a GUI element associated with the panning region and painted over the corresponding source content in the viewport window. In an alternative embodiment, the actual source content may be manipulated to provide the amount of translucency. Viewport window 112 also includes main non-panning control region 120. Panning control margin adjustment elements 122 and 124 enable a user to modify a size of panning regions 116 and 118. In one embodiment of the invention, panning control margin adjustment elements 122 and 124 are synchronized so that movement of one of the margin adjustment elements will cause each of the panning regions to be correspondingly modified in size, as described with reference to FIG. 6.

Still referring to FIG. 4, availability of panning control within a region of the panning margins 116 and 118 is identified by viewport feedback indicators referred to as panning available range indicator regions 114 (also referred to as panning available region). These indicators appear as thin elements obscuring the viewport window's content near the outermost edge of the panning region for which they are associated. Panning available range indicators 114 provide a visual cue that the viewport can be panned in the direction of the indicator. Since the indicators obscure the content, these indicators are small, but large enough to provide adequate feedback. In one embodiment, the pixel width of panning available range indicators is a single pixel, however, any suitable pixel size may be applied. The color or image of panning available range indicator regions 114 may be chosen to compliment the source content or be uniform for the interface. As with all colors and graphics used in the system's interface, the indicators can be chosen to avoid interference with the source image as well as for aesthetics. The indicators may be opaque or translucent as the viewport size already limits what can be seen of the source image along those edges. In the figures included herein, these indicators are opaque rectangles. One skilled in the art will appreciate that there are numerous configurations/colors possible for these indicators.

Panning available range indicators 114 appear along the edge of the viewport window only where the source image extends beyond viewport 112 in one embodiment. For example, if a viewport is positioned to the upper left of a source content such that more source content is available to the right or below, i.e., viewport 112 is smaller than the source content, panning available range indicators 114 will be shown on the right and bottom panning regions within the panning margin as illustrated below with reference to FIG. 5A.

In one embodiment, the saturation or intensity of a panning available range indicator 114 will reflect the percentage of pan that can still be performed in the direction of the indicator. For example, a viewport leftmost positioned relative to source content that can be panned to the right may reveal a highly saturated panning available range indicator 114 on the right of the viewport window. As viewport 112 is slowly panned to the right, panning available range indicator 114 will appear on the left of the viewport window, but the intensity of this indicator will be low to reflect that there is not much panning movement available to the left (as a percentage of the total viewport movement range possible). As the panning continues to the right, the left indicator will increase in saturation/intensity, while the right indicator decreases in saturation/intensity. This will continue until the right indicator no longer appears (no more panning is available to the right) and the left indicator is at maximum saturation/intensity of the interface. Using this technique, panning available range indicators 114 not only reflect that panning is available in the intended direction, but can be used to gather a rough or relative spatial understanding about the range of movement still available and the relative location of viewport 112 within the source content.

In another embodiment, panning available range indicators 114 only appear when the user interface pointer, e.g., mouse cursor, is within the viewport window. In yet another embodiment, panning available range indicators 114 only appear for a brief period of time when the pointer is within the viewport window and the pointer is moving. When the pointer stops moving for a specified interval of time, the panning available range indicators 114 disappear until pointer movement resumes, thus limiting the intrusiveness of the interface. These methods provide a way to remove obscuring of the source content when viewing is the primary operation, rather than interaction. Of course, feedback of the panning range and available panning directions will not be available until interaction resumes (as defined by mouse movement).

Figure 5A:
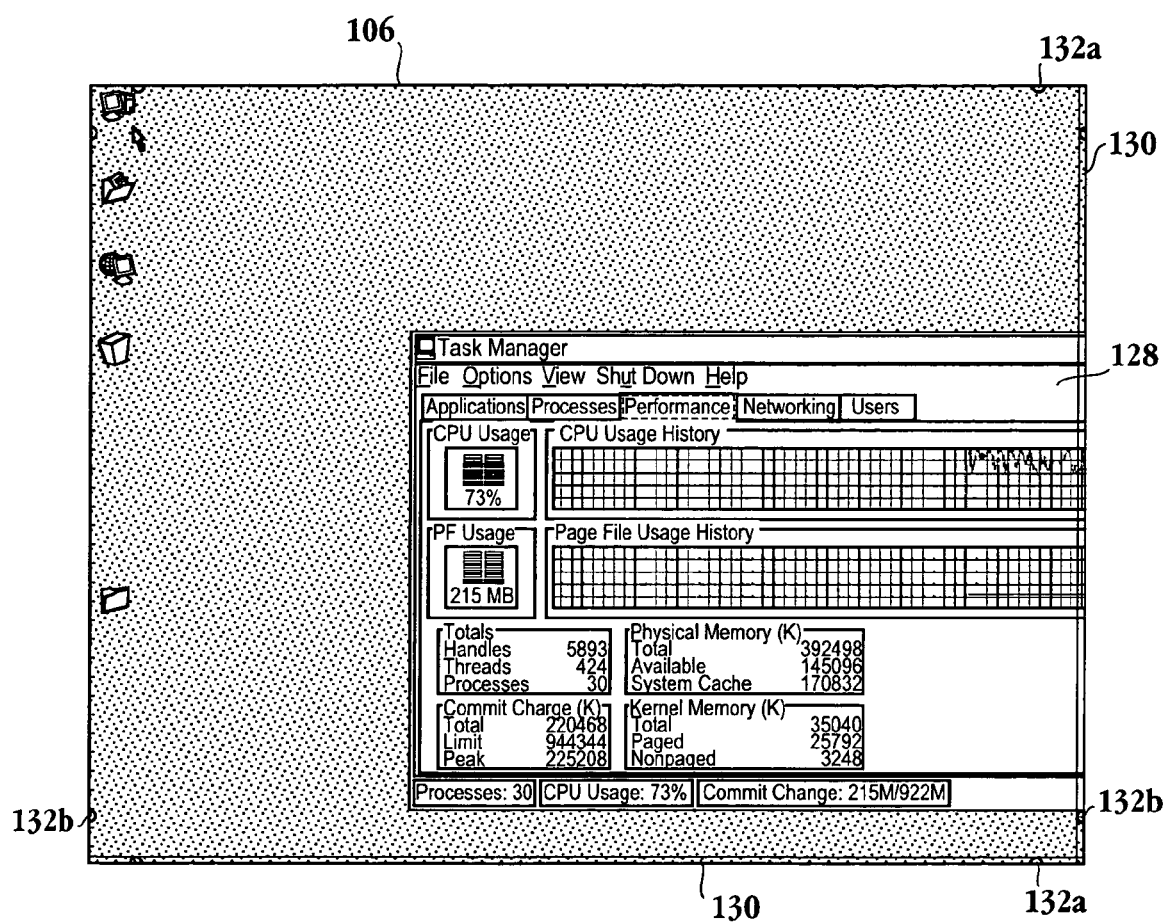
FIG. 5A is a simplified schematic diagram illustrating a magnified version of the source content of FIG. 2, such that the source content is larger than the viewport in order to apply the panning techniques in accordance with one embodiment of the invention.

FIG. 5A is a simplified schematic diagram illustrating a magnified version of the source content of FIG. 2, such that the source content is larger than the viewport in order to apply the panning techniques in accordance with one embodiment of the invention. Viewport 106 includes a portion 128 of the source content. In one embodiment, the source content is captured through an application sharing program as described above. Panning available range indicators 130 appear along the edge of viewport window 106 where the source image extends beyond viewport 106. For example, viewport 106 illustrates panning available range indicators 130 on the right hand and bottom edges of the viewport. Thus, the source image extends beyond the right hand and bottom edges of viewport 106, but not the top and left hand edges. In one embodiment, the saturation or intensity of panning available range indicators 130 reflects the percentage of panning that can be still performed in the direction of the panning available range indicator 130 as mentioned above.

Panning margin adjustment elements 132a and 132b of FIG. 5A are shown as semicircles along an inside edge of the viewport. As used herein, panning control margin adjustment elements 132a and 132b may be referred to as panning control region margin markers or dots. It should be appreciated that any suitable shape besides a semicircle may be displayed along the viewport edge to designate panning margin adjustment elements 132a and 132b, e.g. a circle or dot, square, etc., thereby marking the dividing lines between otherwise invisible regions. It should be further appreciated that users may use panning margin adjustment elements 132a and 132b to adjust the size of the panning regions, i.e., to increase or decrease the size of the panning regions. In one embodiment, the dot elements representing panning margin adjustment elements 132a and 132b are translucent so as not to obscure the source content. In one exemplary embodiment, a user clicks on panning margin adjustment elements 132a to adjust a panning region at the right hand side of viewport 106. Likewise, by clicking on panning margin adjustment elements 132b, the bottom panning region of viewport 106 may be adjusted. Of course, each of panning margin adjustment elements 132a and 132b may be synchronized so that adjustment of one of the panning margin adjustment elements adjusts all of the panning margin regions. In one embodiment, only when the source image does not extend beyond an edge of the viewport window, e.g., a panning available range indicator is invisible, the panning margin adjustment elements are shown. However, the panning margin adjustment elements are not shown at other times e.g., while panning.

Figure 5B:
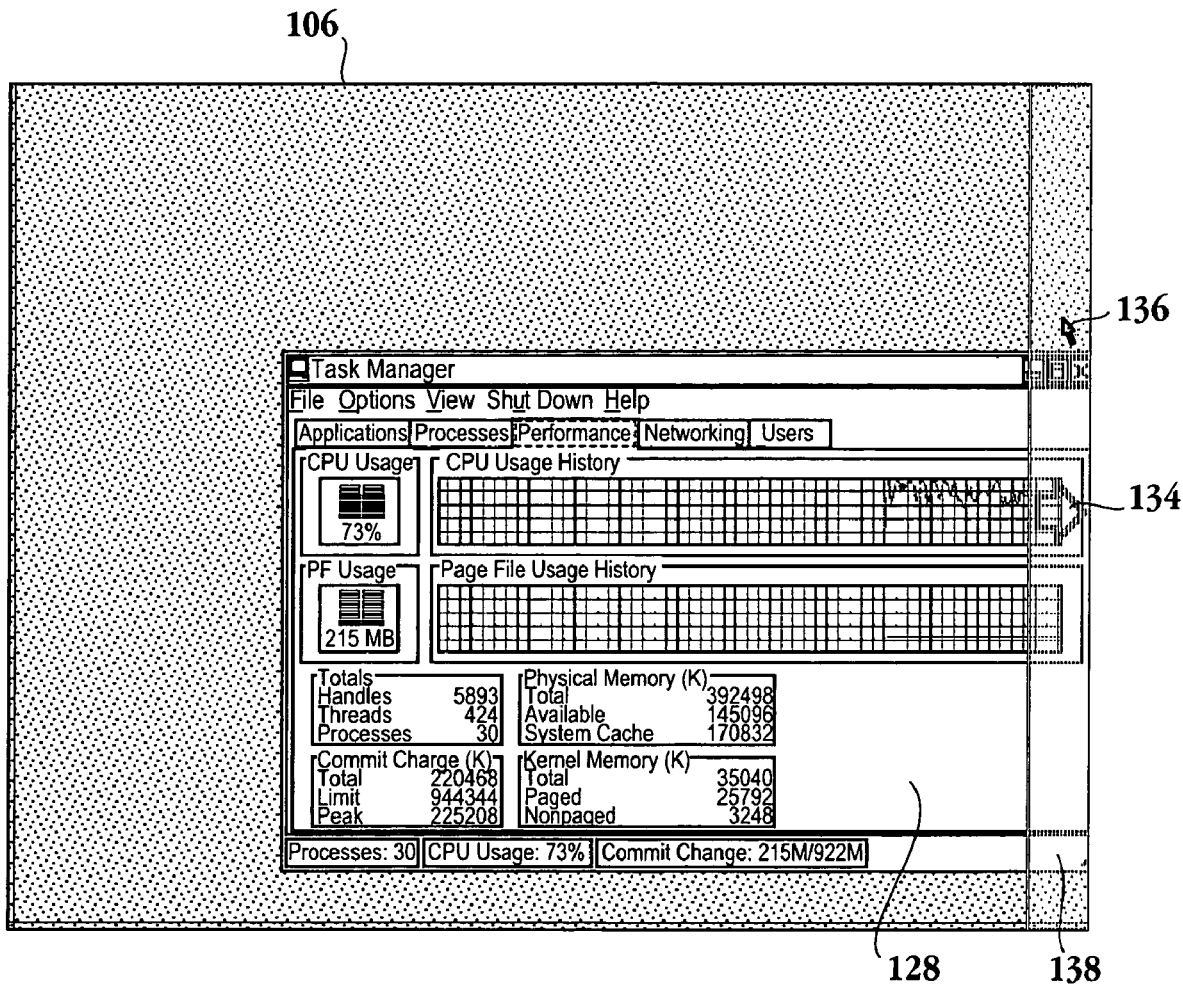
FIG. 5B illustrates a panning operation performed within the viewport of FIG. 5A in which additional source content is revealed in accordance with one embodiment of the invention.

FIG. 5B illustrates a panning operation performed within the viewport of FIG. 5A in which additional source content is revealed in accordance with one embodiment of the invention. Mouse cursor 136 is moved within panning region 138 in order to trigger panning in the direction associated with panning region. Thus, within viewport 106 source content 128 appears to move to the left. In one embodiment, a rate of panning is indicated by the translucency of panning region 138. In another embodiment, as the translucence of panning region indicator 138 decreases, i.e., the opacity increases, the panning rate increases. Of course, this relationship may be reversed in yet another embodiment. Panning directional feedback rate indicator 134, also referred to as a directional marker, is used to reinforce the directional information conveyed by the indicator's shape and position. Panning directional feedback rate indicator 134 is depicted as an arrow indicating the panning direction, and in one embodiment the panning directional feedback rate indicator becomes less translucent as the panning rate increases, similar to the translucence of panning region 138, which also serves as a panning feedback rate indicator.

Panning control is provided by selecting a direction to move the viewport position relative to the source content. The direction of the panning is determined when a user interface 'panning control' pointer is within the panning margin, or specifically, within an invisible panning region. Moving a mouse pointer, for example, over a panning region, such as the panning regions of FIGS. 3 and 4, will cause the viewport to start repositioning in the direction of panning region relative to the viewport window. Hovering over this region will continue the panning operation. For example, with reference to FIG. 3, if the user interface pointer is within panning region "B", the viewport would pan up. If the user interface pointer is within region "C" the viewport would pan up and to the right. If the user interface pointer is within "G" the viewport would pan down and to the left, etc. When the mouse is in the panning margin, and panning in the specified direction is possible, the panning proceeds as illustrated through FIG. 5A-C. While panning, a panning feedback rate indicator appears. In one example, the panning feedback rate indicator is shown as a translucent colored shape filling the active panning regions marked with panning available range indicators. The panning feedback rate indicator is composed with the source image to indicate the direction of the pan. In one implementation the panning feedback rate indicators are rectangles filled with a single solid color. However, the panning feedback rate indicators may be multiple colors, patterns, graphics, or effects such as a translucency gradient or warping of the covered portion of the source image. Other parts of the feedback system such as the panning margin adjustment elements may be hidden for the duration of the pan for clarity. As mentioned above, the panning feedback rate indicator may incorporate one or more arrow-like images to reinforce the directional information conveyed by the indicator's shape and position.

Figure 5C:
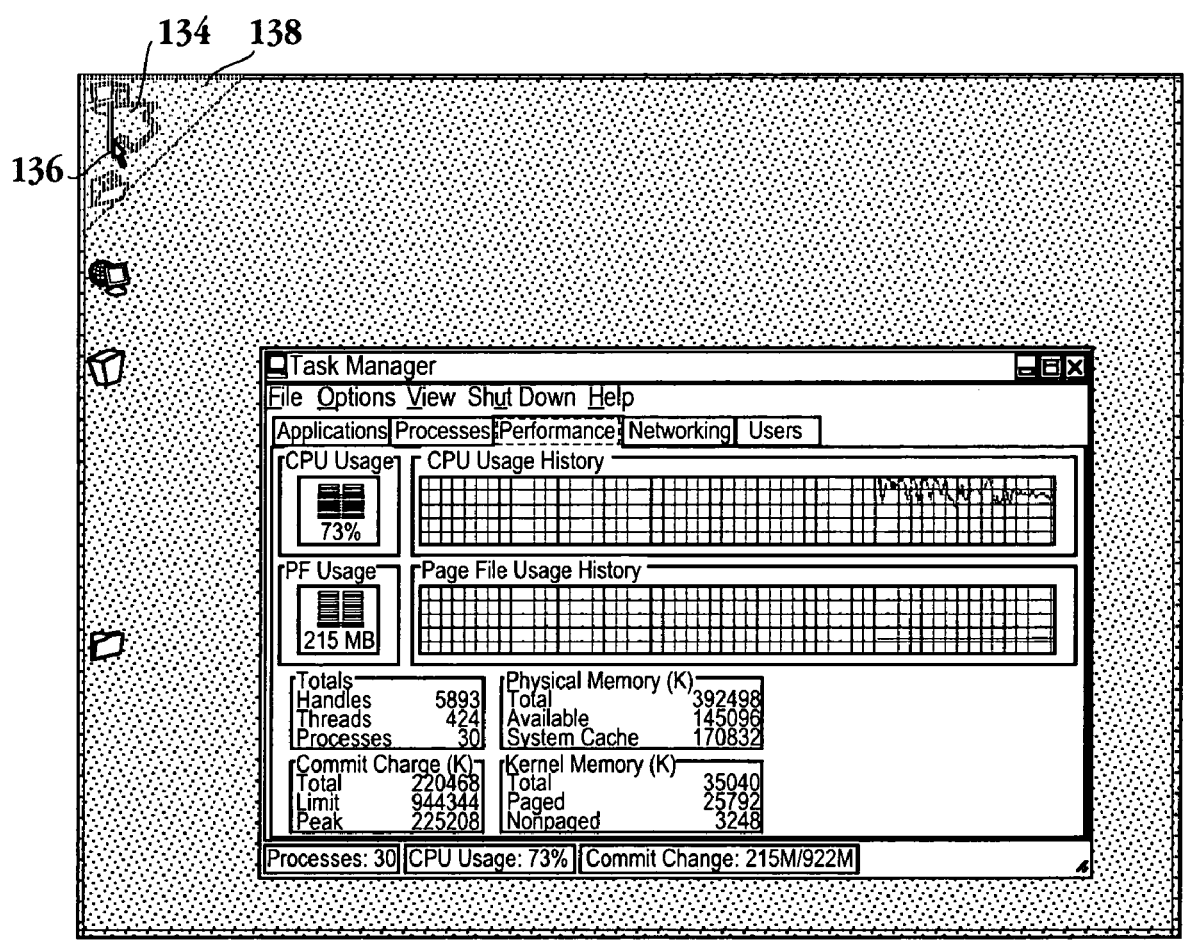
FIG. 5C represents an embodiment where the panning direction is proceeding in a diagonal direction in accordance with one embodiment of the invention.

The shape and position of the panning feedback rate indicator is typically determined by the panning regions over which the panning operation is being performed. For example, when the user interface pointer is within a corner panning region (A, C, G, or I, with reference to FIG. 3) a triangle may be used to show the panning feedback rate indicators as illustrated in FIG. 5C. If the user interface pointer is within an edge region (B, D, F, or H of FIG. 3) a rectangle may used as illustrated in FIG. 5B. The position of the indicator matches closely with the coordinates of the panning region it indicates, though the indicator may be stretched or otherwise manipulated to improve clarity. For example, in one embodiment an edge region's indicator rectangle is stretched to cover the entire viewport edge (including a corner region). Likewise, a corner region may actually overlap an edge region indicator in the triangle shape.

Translucency of the panning feedback rate indicator allows landmarks in the source image to still be seen clearly. The degree of translucency used corresponds to the panning rate, with both determined by the distance of the user interface panning control pointer, e.g., a mouse cursor, from the viewport window's edge or corner and within the panning margin. In one embodiment, the more the pointer is within the panning margin and closer to the viewport window's edge, the faster the panning rate and the less translucent (more opaque) the indicator becomes, as illustrated further with reference to FIGS. 7A and 7B. The decreased translucency when the panning rate is increased is one exemplary method of indicating the panning rate. Alternatively, in one embodiment, the translucency may be increased as the panning rate increases. It should be appreciated that the continuous feedback of the translucency of the indicator helps the user identify and control the panning rate more accurately. While the movement of the source surface within the viewport provides some indication of the panning rate, the changing (translucent to more opaque) panning feedback rate indicator provides an easier comparative identification of the speed and allows for easier throttle control. Additionally, the panning rate feedback indicator provides immediate feedback that the viewport is actively being panned by the user, and not just that the source content within the viewport window is moving/changing, which may be in response to a remote users actions with regard to a sharing application.

The maximum and minimum rates may be determined by the size of the panning margin, the size of the source content relative to the viewport, fixed values, or any other suitable method. In one embodiment, this rate adjustment may be a linear translation of the pointer's relative position within the panning margin to minimum and maximum values for speed and opacity chosen to optimize usability. Alternately, non-linear translation of the values is also possible to provide more panning rate throttle control resolution in a limited region. The range of panning speed can also be linked to the degree of source surface magnification. For example, if the viewport is a quite small relative to the source surface, the panning rate may need to be increased for all positions within the panning margin. Appropriately, the translucency of the panning feedback rate indicator may never be fully opaque, so that the source surface is always partially visible during panning operations. In one embodiment, when the user interface pointer leaves the panning margin, the panning operation is immediately stopped and the panning feedback rate indicator is immediately removed.

FIG. 5C represents an embodiment where the panning direction is proceeding in a diagonal direction in accordance with one embodiment of the invention. Mouse cursor 136 is placed in panning region 138 in order to trigger the diagonal panning. The diagonal movement is further indicated through panning directional feedback rate indicator 134 within the triangular panning region 138. Thus, when mouse cursor 136 is within a corner panning region, e.g., panning region 138, a triangle region having a certain translucency based on the rate of panning may be illustrated as the panning feedback rate indicator. Of course, the translucency of arrow 134 within triangular panning region 138 may be used as an additional panning feedback rate indicator, in conjunction with the translucency of the triangular panning region. As illustrated in FIG. 5B, if the mouse cursor 136 is within an edge region, a rectangular panning region is illustrated.

Figure 6:
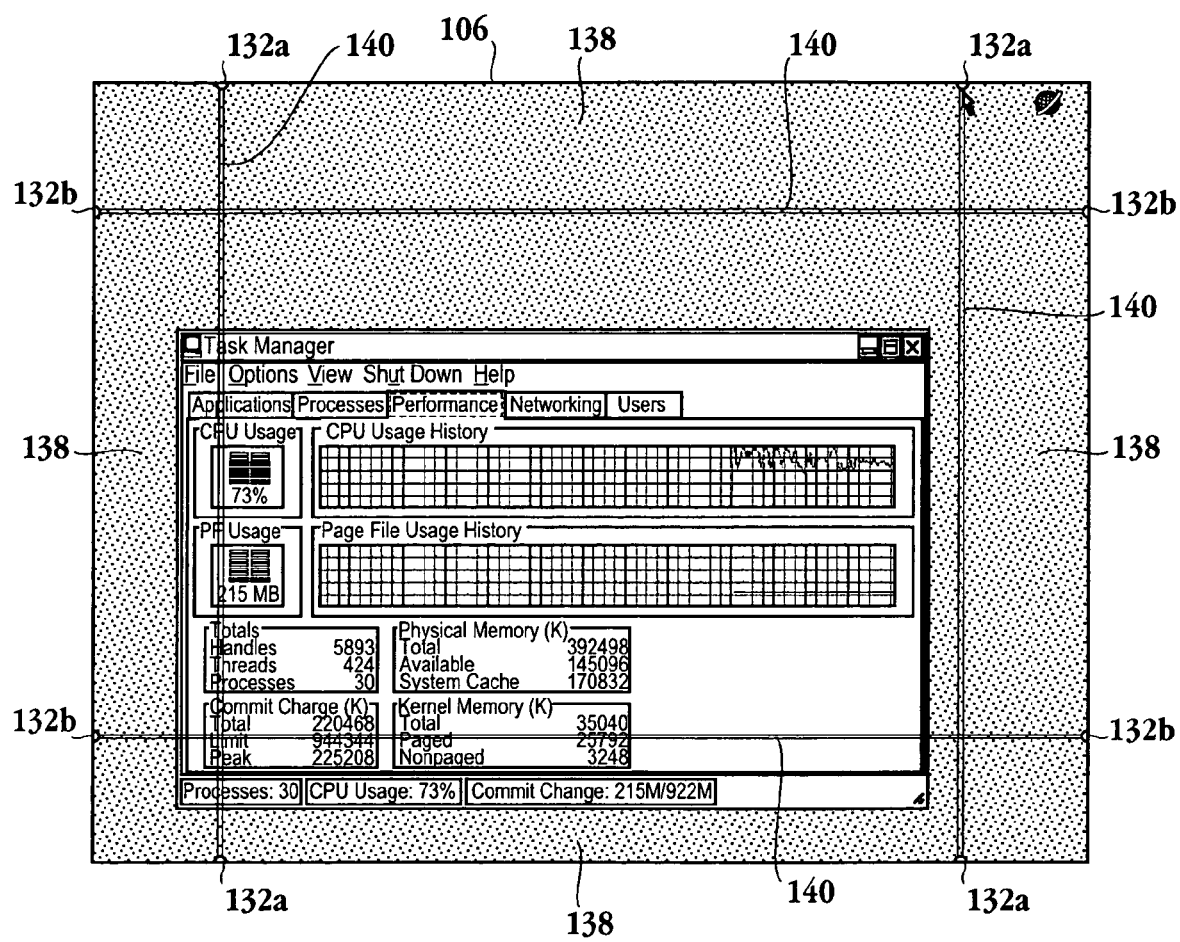
FIG. 6 illustrates a simplified schematic diagram depicting advanced configuration features for adjusting the panning region size in accordance with one embodiment of the invention.

FIG. 6 illustrates a simplified schematic diagram depicting advanced configuration features for the panning region size in accordance with one embodiment of the invention. A user may wish to change the size associated with panning region 138 and may do so by clicking on and dragging one of the panning margin adjustment elements 132a and 132b positioned at viewport 106 edges. In one embodiment, line 140 may be drawn between linked pairs of margin adjustment elements 132a and 132b when the user clicks on one of the margin adjustment elements to help visually illustrate the extent of panning region 138. It should be appreciated that a width of panning region 138 may be adjusted between minimum and maximum values that can take the size of the viewport and source image into account. In one embodiment, the margin adjustment elements on all sides are synchronized, and cause the panning regions along all the edges to be adjusted together. That is, if one of margin adjustment elements 132a or 132b is clicked on and dragged, then the size of each of the individual panning regions is adjusted accordingly.

A user who wishes to change the size of the panning regions of FIG. 6 may do so by clicking on and dragging one of the panning margin adjustment elements 132a or 132b positioned at the viewport window's edges. Additional lines 140 may be drawn between linked pairs of panning margin adjustment elements 132a or 132b (on the edges of the respective panning regions) to help show the extent of the panning region. The panning region could also be indicated by, for example, translucent rectangular overlays. However, the implementation with lines obscures less of the source image while having similar representational clarity. Similarly, triangles, rectangles, or other shapes could be used instead of semi-circles for the panning margin adjustment elements. In one embodiment, these elements only become visible when the viewport reaches an edge of the source image, and disappear after a short time period, e.g., a few seconds, has elapsed. This timeout ensures that the controls will not interfere with a user's desired operation, e.g., ending a drag, in the unlikely case that the dots overlap the needed screen item. In one embodiment, this timeout is reset if the user leaves the panning region, and it is disabled and reset if the user begins a margin adjustment, being restarted when the adjustment ends. It should be appreciated that the elements can reshow again, after hidden by timer, by more mouse movement. Panning region size can be adjusted between minimum and maximum values that can take the size of the viewport and source image into account. In one implementation, the panning region widths on all sides are synchronized and are adjusted together. Alternatively, the panning region widths may be independently configured for each margin. The panning margin adjustment elements and the connecting visual indicator lines can be shown in a different color to highlight their active state. In one embodiment, while the margins are being adjusted, any panning available range indicators may be hidden for clarity.

Figure 7A:
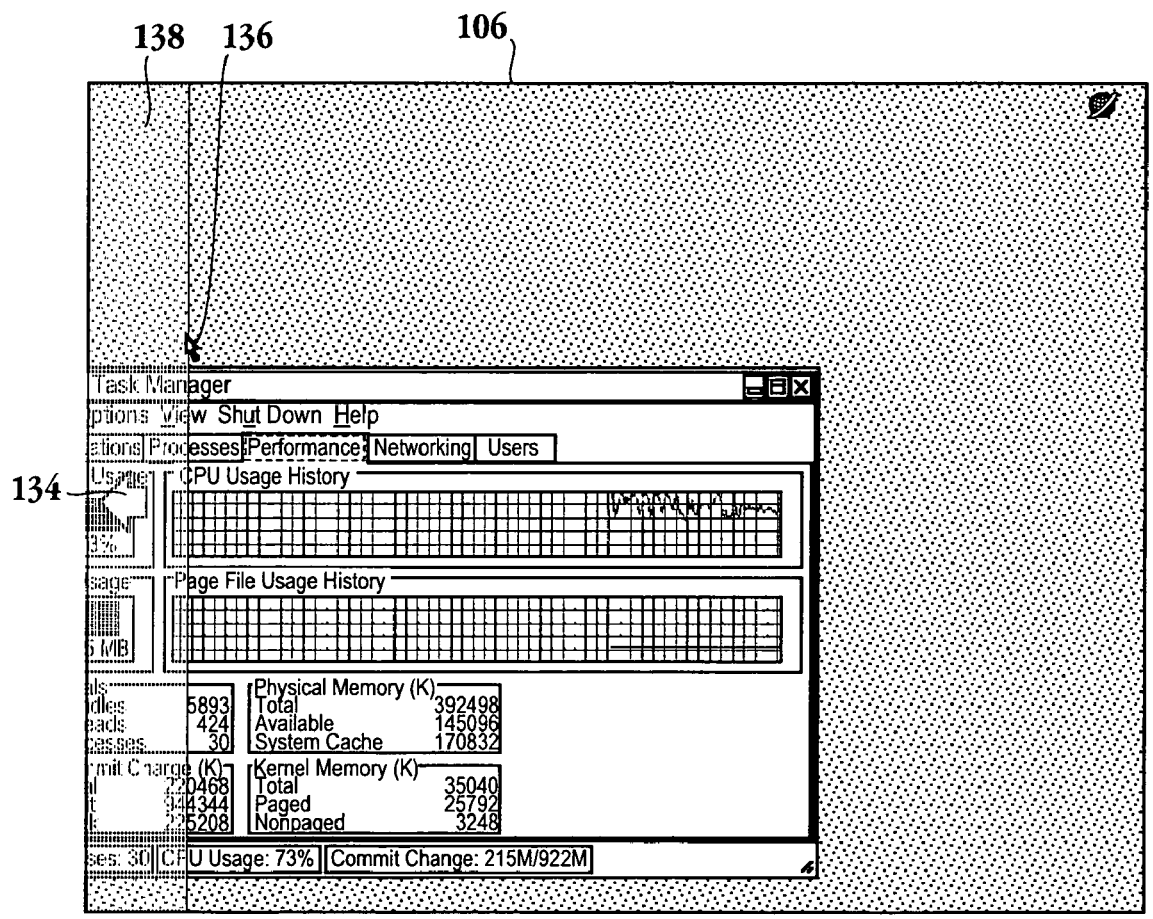
FIGS. 7A and 7B illustrate the viewport being moved at different rates according to a depth of the mouse cursor within the panning region in accordance with one embodiment of the invention.
Figure 7B:
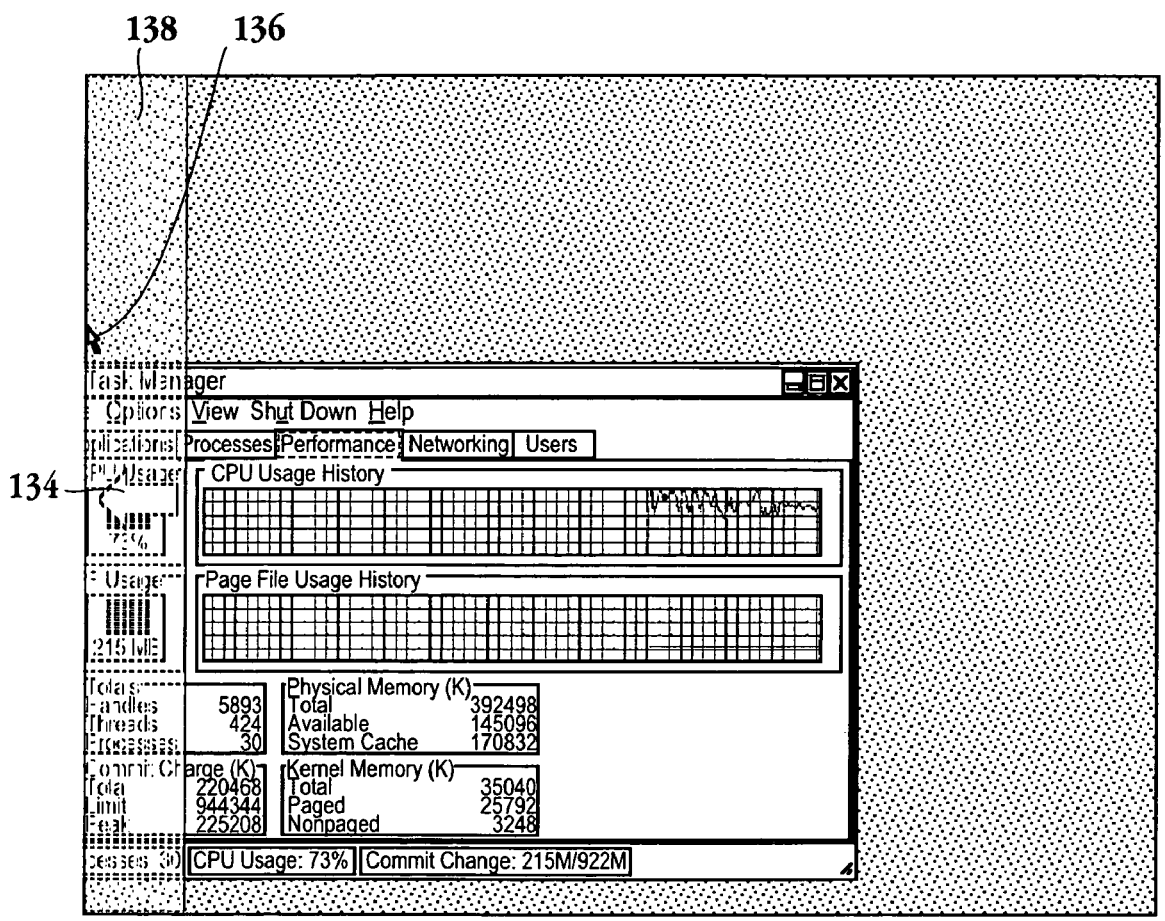

FIGS. 7A and 7B illustrate the viewport being moved at different rates according to a depth of the mouse cursor within the panning region in accordance with one embodiment of the invention. Mouse cursor 136 has just barely entered an innermost portion of panning region 138 in FIG. 7A. The entrance into panning region 138 by mouse cursor 136 triggers movement or panning in the direction associated with panning region 138. Thus, viewport 106 will appear to be moving towards the left and additional source content will appear within the viewport. As mentioned above, the degree of translucency within panning region 138 corresponds to the panning rate, with both determined by the distance of the user interface panning control pointer, i.e., mouse cursor 136, from the viewport window edge or corner when the pointer is within the panning region. The more that mouse cursor 136 is within panning region 138 and closer to the viewport window edge, the faster the panning rate. In addition, the panning region becomes less translucent, i.e., more opaque, as mouse cursor 136 moves deeper into panning region 138, as illustrated in FIG. 7B. For example, in FIG. 7A the translucency of panning margin 138 is almost entirely transparent, reflecting that mouse cursor 136 has just entered panning region 138, thereby indicative that the panning will be at its minimum speed. In FIG. 7B, the mouse indicator 136 is closer to the viewport window edge and thus the indicator is more opaque. This is indicative that the panning will proceed at a maximum speed. Along with the translucency of arrow 134, the translucency of panning region 138 may be used as panning feedback rate indicators. In one embodiment, there is a time delay after mouse cursor 136 enters panning region 138, in order to provide the user with a visual indicator warning that panning is about to begin.

Figure 8:
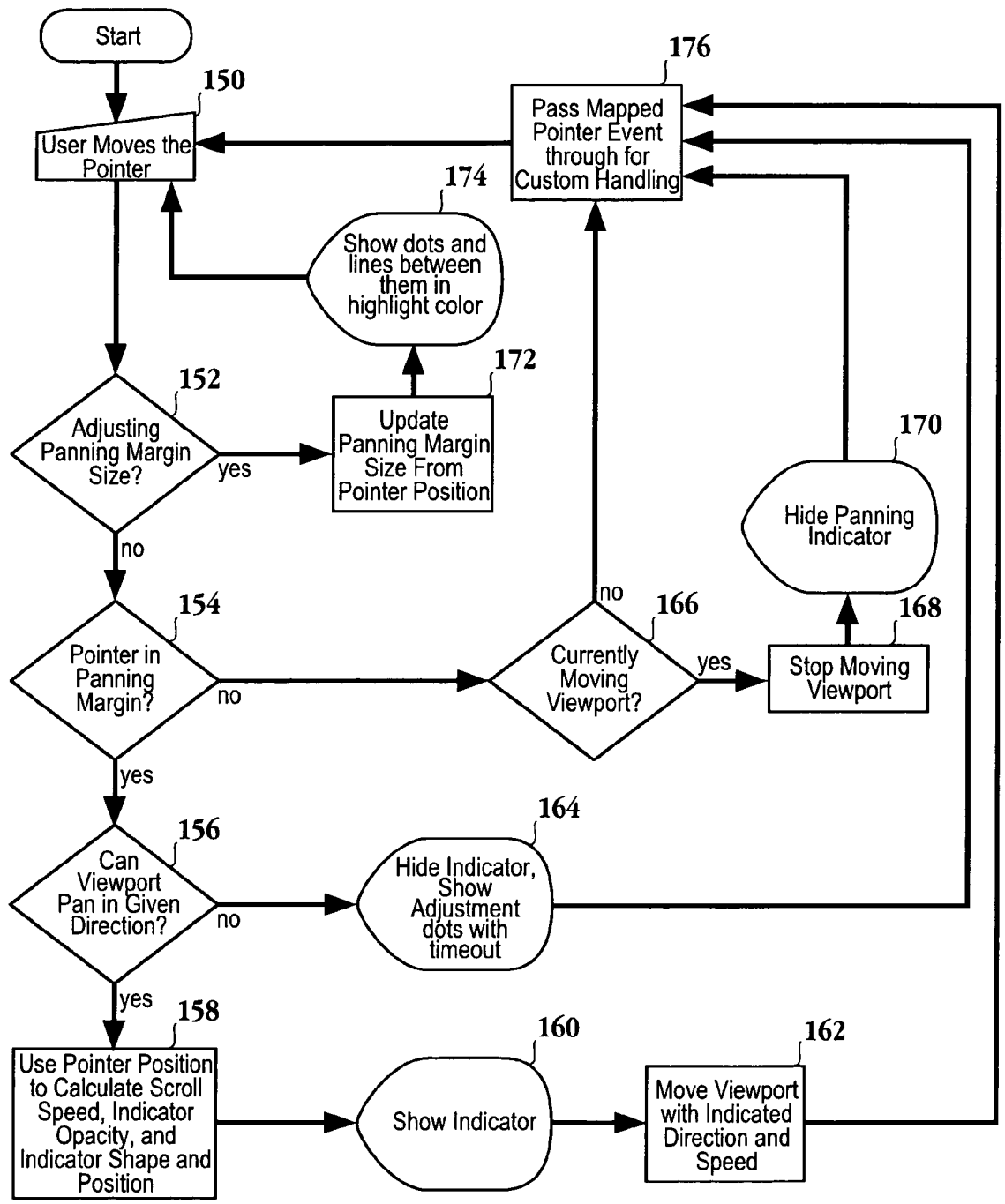
FIG. 8 is a flow chart diagram illustrating the method operations of operations triggered by movement of the pointer in accordance with one embodiment of the invention.

FIG. 8 is a flow chart diagram illustrating the method operations triggered by movement of the pointer in a viewport in accordance with one embodiment of the invention. The method initiates with operation 150 where a user moves a pointer, i.e., the mouse cursor. The method then advances to decision operation 152 where it is determined if a panning margin/region size is being adjusted. For example, the user may be moving the mouse cursor to adjust a panning margin/region size. If the panning margin size is being adjusted, the method advances to operation 172 where the panning margin size is updated from the pointer position, i.e., position of the mouse cursor. The method then proceeds to operation 174 where the dots and lines between the panning margin adjustment elements may be highlighted in color. In one embodiment, the clicking on the panning margin adjustment elements may cause the lines illustrated with reference to FIG. 6 to appear in a certain color. In one embodiment, this color changes during the resizing operation to highlight an active state as discussed above.

If the panning margin size is not being adjusted in operation 152, the method proceeds to decision operation 154 where it is determined if the pointer is within the panning margin/region. If the pointer is within the panning margin/region, the method advances to decision operation 156 where it is determined that the viewport is able to pan in the given direction. If the viewport is able to pan in the given direction, the method proceeds to operation 158 where the pointer position is used to calculate the panning rate, indicator opacity, and indicator shape and position. In one embodiment, the closer the mouse cursor is to a viewport edge, i.e., the deeper into the panning region, the faster the panning rate becomes and the translucency is decreased, as compared to when the mouse cursor is slightly into the panning region. The method then moves to operation 160 where the indicator is shown. For example, the panning region may be associated with a translucent rectangular or triangular shape as described with reference to FIGS. 5A-C and 7A-B. In operation 162 the viewport is moved with the indicated direction and speed, i.e., the panning of the source content initiates. The method then advances to operation 176 where the mapped pointer then is passed through for handling by the native viewport window handling method as defined by the application defining the viewport window.

If, in operation 154 of FIG. 8, the pointer is not in the panning margin, the method advances to decision operation 166 where it is determined if the viewport is currently moving. If the viewport is currently moving, then the method advances to operation 168 where the viewport is stopped from moving, as the pointer has moved outside the panning margin. In operation 170, the panning indicator is hidden, i.e., the panning indicators in the panning region disappears as well as any directional indicators, such as arrows, and the method advances to operation 176. If, in decision operation 166, the viewport is not currently moving, the method will then proceed to operation 176. If, in decision operation 156, it is determined that the viewport cannot pan in the given direction, the method proceeds to operation 164 where the indicator is hidden and the panning margin adjustment elements are shown for a specified time period and may time out, i.e., disappear from view after the time out period. The method then moves to operation 176 and repeats as described above.

Figure 9:
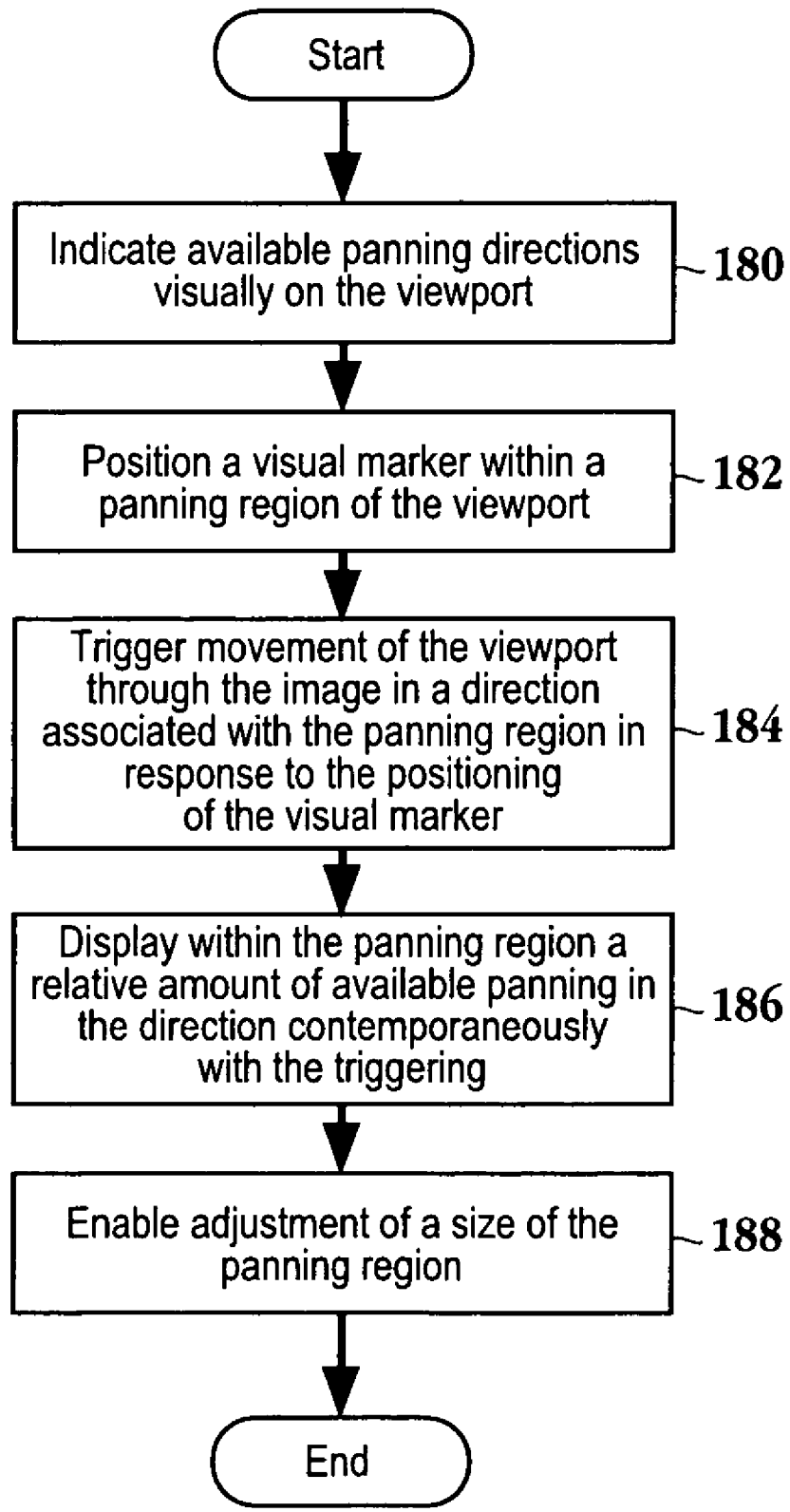
FIG. 9 is a flow chart diagram illustrating the method operations for panning an image through a viewport in accordance with one embodiment of the invention.

FIG. 9 is a flow chart diagram illustrating the method operations for panning an image through a viewport in accordance with one embodiment of the invention. The method initiates with operation 180 where the available panning directions are indicated visually on the viewport. For example, panning available range indicator regions as mentioned with reference to FIG. 4 may be used to indicate available panning directions. These panning available range indicator regions may appear as thin elements obscuring the viewport window's content near the outermost edge of the panning region for which they are associated. A panning available range indicator provides a visual cue that the viewport can be panned in the direction of the indicator. Since the range indicator regions obscure the content, these indicators shall be small, but large enough to provide adequate feedback. The color or image of these elements may be chosen to compliment the source content or be uniform for the interface. As with all colors and graphics used in the system's interface, the range indicator regions can be chosen to avoid interference with the source image as well as for aesthetics. The panning available range indicator regions may be either opaque or translucent as the viewport size already limits what can be seen of the source image along those edges. For example with reference to FIGS. 7A-B, these elements are depicted as opaque rectangles which may be associated with any color.

The method of FIG. 9 then advances to operation 182 where a visual marker within a panning region of the viewport is positioned. For example, the panning margin indicators may appear translucent in response to a pointer, e.g., a mouse cursor, moving into the panning region. As mentioned above, the degree of translucency is indicative of the panning rate in one embodiment. The method then proceeds to operation 184 where movement of the viewport through the image or source content in the direction associated with the panning region is triggered in response to the positioning of the visual marker or pointer within the panning region. As mentioned above, the mouse cursor may be moved within the panning region in order to trigger the movement. The method then proceeds to operation 186 where a relative amount of available panning in the direction is displayed within the panning region contemporaneously with the triggering of the movement. Here, the translucency of the panning margin indicators may change in order to indicate the speed or rate at which the panning occurs. In addition, the panning margin and/or the panning available range indicator regions may become more intense or less intense depending on the amount of available panning in the direction. The elements can reshow again with mouse movement. In addition to showing the relative rate of the panning that is occurring, the panning region feedback indicators may only be visible during active panning. Thus, once a mouse cursor moves out of the panning region the visible indicators may disappear, reappearing after mouse movement within the panning region. The method then advances to operation 188 where the adjustment of a size of the panning region is enabled. As described above, the panning margin adjustment elements may be used to adjust the size of the panning region. Of course, the panning adjustment margin elements may each be synchronized in one embodiment of the invention. Alternatively, the panning adjustment margin elements may act independently.

Figure 10:
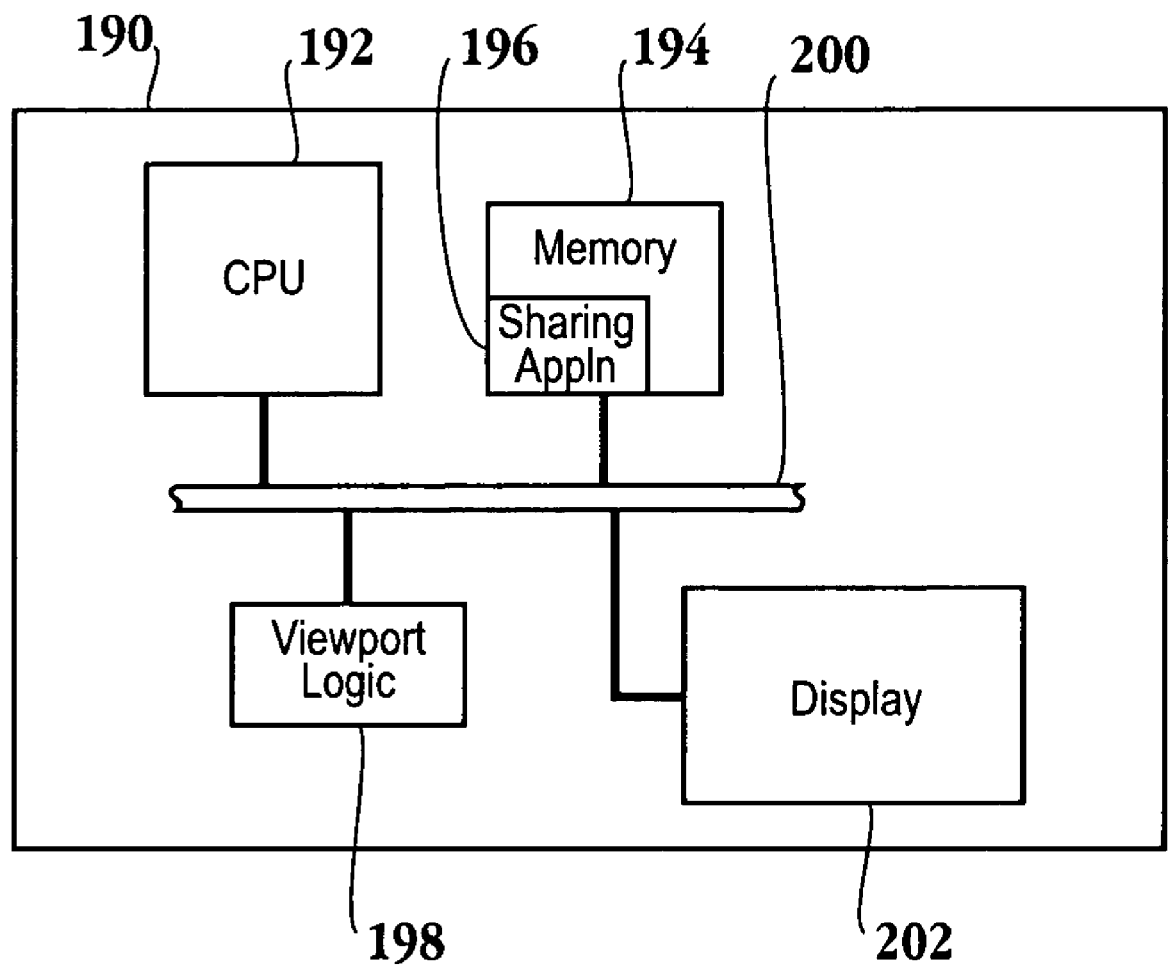
FIG. 10 is a simplified schematic diagram illustrating a computing device capable of enabling the panning functionality described herein in accordance with one embodiment of the invention.

FIG. 10 is a simplified schematic diagram illustrating a computing device capable of enabling the panning functionality described herein in accordance with one embodiment of the invention. Computing device 190 includes central processing unit (CPU) 192, memory 194, which includes sharing application 196. Computing device 190 also includes viewport logic 198. CPU 192, memory 194, and viewport logic 198 are in communication with each other through bus 200. One skilled in the art will appreciate that sharing application 196 may be computer code stored in memory 194 which is executed by CPU 192. Of course, sharing application 196 is optional. That is, computing device 190 may be communicating with a remote device or the computing device may be used to view large maps or other images at an information kiosk, where the input options are limited to a touch screen or a similar device where a finger pointer must remain in a pressed state to continue an operation. In essence, the embodiments described herein may be applied to any suitable device where source content is to be displayed on a display screen or viewport which is too small to display the entire source content reasonably. In one embodiment, viewport logic 198 may be embodied as computer readable code that is stored in memory 194. However, viewport logic 198 may alternatively be a combination of hardware and software configured to execute the functionality described herein.

Computing device 190 of FIG. 10 includes display 202, which is in communication with bus 200. As mentioned above, display 202 may be configured to illustrate a graphical user interface in which a viewport is displayed thereon. Through the viewport, a source image, which is associated with a size larger than the size of display 202 may be illustrated and panned through the embodiments described herein. In one embodiment, viewport logic 198 is configured to provide multiple visual indicators revealing availability of panning the image data, availability of a panning direction, a relative location of a portion of the image data or source content being displayed, and a panning rate when moving from the portion of the image data along a panning path to a second portion of the image data.

In summary, the above-described invention provides a non-intrusive variable rate viewport panning feedback system. The embodiments described herein may be incorporated into various handheld devices that may be used remotely to access another computing device through an application sharing program. For example, a user may access a remote computing device through a personal digital assistant (PDA), pocket personal computer, a cellular phone, etc., where a viewport is used to display the source content of the remote computing device. The above-described embodiments may also be used in conjunction with video-conferencing systems that utilize application sharing programs. In one exemplary embodiment, the viewport panning feedback system is incorporated with the IMX™ videoconference system of the assignee.

As discussed above, the rate of panning is controlled by the relative depth/distance of the mouse pointer within the panning control region, wherein the panning control region remains within the viewport window's boundary. The available panning directions may be shown by graphical elements overlapping and obscuring (only partially if transparent) the bounding pixel(s) of the viewport source content. The relative amount of panning available in a given direction is indicated by the intensity, saturation, or some other suitable visible characteristic, of the available panning direction indicators. In one embodiment, only when panning is activated does the system reveal visual indicator(s) showing that the local user is initiating panning via the mouse pointer position, as opposed to just seeing source content panning. In application sharing or similar arrangement where the source content of the viewport may be changing or moving independently of the viewing user, the local user requires feedback that they are in some way affecting the panning operation. This feedback is provided through the embodiments described above. Additionally, the dynamic change of transparency, intensity, shape, etc., of the visual indicator to indicate the panning rate, which may change with the movement of the mouse pointer within the panning region, provides further visual feedback to a user, particularly with reference to application sharing. The embodiments discussed above further provide a minimally intrusive technique for changing the size or shape of the panning region. Thus, panning may be activated in more or less area of viewport, and the rate of panning can have a larger or smaller range if tied to the region depth.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data that can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for panning an image through a viewport, comprising method operations of:
   indicating available panning directions visually on the viewport;
   positioning a visual marker within a panning region of the viewport;
   triggering movement of the viewport through the image in a direction associated with the panning region in response to the positioning of the visual marker; and
   displaying within the panning region a relative amount of available panning in the direction contemporaneously with the triggering;
   wherein the method operation of indicating available panning directions visually on the viewport includes displaying a border at least one pixel wide at an outermost edge of the viewport, and adjusting a visible characteristic of the border to indicate an amount of panning available in the panning direction.

2. The method of claim 1, further comprising:
   updating the relative amount of available panning by adjusting a display intensity of the panning region as the image moves.

3. The method of claim 1, wherein the visible characteristic of the border comprises an intensity of a color of the border.

4. The method of claim 1, wherein the method operation of displaying within the panning region a relative amount of available panning in the direction contemporaneously with the triggering includes,
   displaying a directional marker indicating the direction of movement.

5. The method of claim 1, wherein the method operation of triggering movement of the viewport through the image in a direction associated with the panning region includes,
   indicating a rate of the movement by adjusting a degree of translucency of visual indicators within the panning region.

6. The method of claim 1, wherein the image is desktop image data of a remote computing device retrieved through a sharing application of a computing device displaying the viewport.

7. The method of claim 1, further including:
   enabling adjustment of a size of the panning region.

8. The method of claim 7, wherein the adjustment of the size of the panning region is synchronized with other panning regions thereby triggering size adjustment of each panning region in response to the adjustment of the panning region.

9. A medium or waveform containing executable program instructions, which, when executed, are adapted to perform the method of claim 1.

10. A graphical user interface (GUI) displaying a viewport through which an image can be viewed, the GUI comprising:
    a panning control region defined within an outer boundary of the viewport within the GUI, the panning control region having multiple segments, each of the multiple segments corresponding to a panning direction, wherein a panning rate is indicated by a level of translucency of the multiple segments; and
    a panning available region defined along the outer boundary of the viewport within the GUI, the panning available region indicating whether a source image extends beyond an edge of the viewport, wherein the panning available region is a subset of the panning control region;

wherein the panning available region is configured so that a visible characteristic of image data within the panning available region is adjustable according to an amount of the source image extending beyond the edge of the viewport.

11. The GUI of claim 10, further comprising:

panning control region margin markers configured to enable adjustment of the multiple segments defining the panning control region.

12. The GUI of claim 10, wherein the source image is associated with a remote computing device, the source image obtained through a sharing application associated with a computing device controlling the viewport being displayed on the GUI.

13. The GUI of claim 11, wherein the panning control region margin markers are synchronized so that adjustment of one of the panning control region margin markers causes corresponding adjustment of each of the margin markers.

14. The GUI of claim 10, wherein the visible characteristic of image data within the panning available region comprises an intensity of image data within the panning available region.

15. A graphical user interface (GUI) displaying a viewport through which an image can be viewed, the GUI comprising:

a panning control region defined within an outer boundary of the viewport within the GUI, the panning control region having multiple segments, each of the multiple segments corresponding to a panning direction, wherein a panning rate is indicated by a level of translucency of the multiple segments; and a panning available region defined along the outer boundary of the viewport within the GUI, the panning available region indicating whether a source image extends beyond an edge of the viewport, wherein the panning available region is a subset of the panning control region:

wherein the panning control region includes a panning directional indicator indicative of the panning direction, a level of translucency of the panning directional indicator corresponding to the level of translucency of the corresponding segment, wherein the panning control region and the panning directional indicator are visible only during active panning.

16. A computing device configured to interact with another computing device, the computing device comprising:

a central processing unit (CPU);

a memory configured to store a sharing application, the sharing application enabling the computing device to create a virtual link with the other computing device so that input devices of the computing device are operable on the other computing device;

a display screen configured to display a first portion of image data from the other computing device within a viewport of the computing device;

viewport logic configured to provide multiple visual indicators within the viewport revealing availability of panning the image data, availability of a panning direction, a relative location of the first portion of the image data, and a panning rate when moving from the first portion of image data along a panning path to a second portion of the image data, wherein the visual indicator for revealing the availability of a panning direction chances its visual appearance as the amount of panning available in the panning direction changes; and a bus enabling communication between the CPU, the memory, the display screen, and the viewport logic.

17. The device of claim 16, wherein the multiple visual indicators include, a panning control region defined within an outer boundary of the viewport within the GUI, the panning control region having multiple segments, each of the multiple segments corresponding to a panning direction, wherein a panning rate is indicated by a level of translucency of the multiple segments;

a panning available region defined along the outer boundary of the viewport within the GUI, the panning available region indicating whether a source image extends beyond an edge of the viewport, wherein the panning available region is a subset of the panning control region; and panning control region margin markers configured to enable adjustment of the multiple segments defining the panning control region.

18. The device of claim 17, wherein the viewport logic is further configured to synchronize the panning control region margin markers so that adjustment of one of the margin markers causes corresponding adjustment of each of the margin markers.

19. The device of claim 17, wherein the panning control region is associated with one of a triangle shape or a rectangular shape.

20. The device of claim 17, wherein the panning available region is visible only when the source image extends beyond the edge of the view port and the panning control region is visible only during panning operations in the panning direction.

* * * * *